Figure 1:
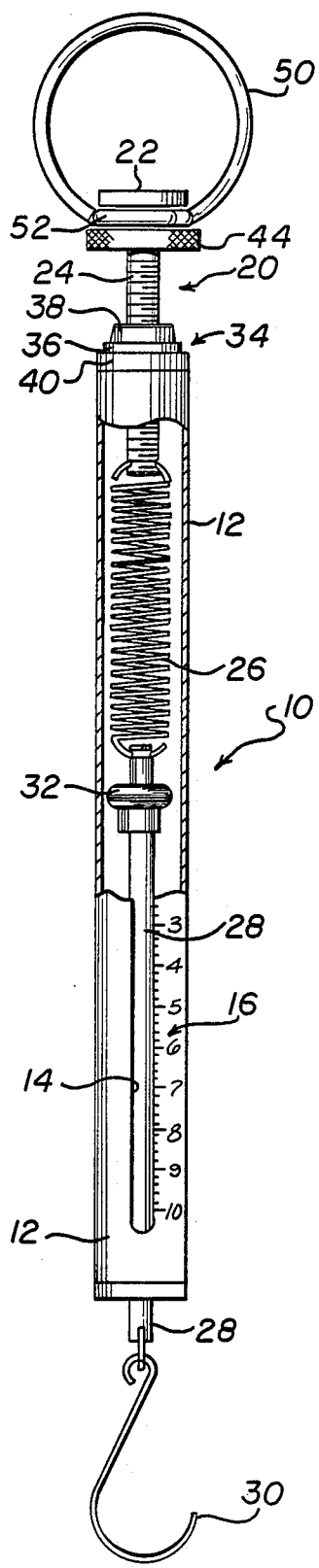

United States Patent [19]
Sumida

[11] Patent Number: 4,964,479
[45] Date of Patent: Oct. 23, 1990

[54] WEIGHT SCALE COMPENSATING FOR TARE

[76] Inventor: Kunio A. Sumida, 1114 N. Kenter Ave., Los Angeles, Calif. 90049

[21] Appl. No.: 418,523

[22] Filed: Oct. 10, 1989

[51] Int. Cl.$^5$ .................... G01G 3/02; G01G 23/14
[52] U.S. Cl. ...................................... 177/233; 177/165
[58] Field of Search .................... 177/232, 233, 165

[56] References Cited

U.S. PATENT DOCUMENTS

| | | | |
|---|---|---|---|
| 67,482 | 8/1867 | Barker | 177/232 X |
| 629,290 | 7/1899 | Goodbaudy | 177/233 X |

Primary Examiner—George H. Miller, Jr.
Attorney, Agent, or Firm—Ellsworth R. Roston; Charles H. Schwartz

[57] ABSTRACT

A hollow housing with openings at opposite ends has progressive indications of weight at progressive positions along an opening in the housing. A threaded shank of a bolt extends longitudinally into the housing through the opening at the first end. A spring disposed in the housing is attached at one end to the bolt shank and at the other end to a rod which extends through the second end of the housing. A coupling member is attached to the rod to hold an article to be weighed. A retaining nut is disposed within the housing at the first longitudinal end of the housing to receive the bolt shank. A packing member retained by the nut is partially tapped to receive the bolt shank. By only partially tapping the packing member, the bolt is retained in fixed position relative to the nut. The bolt is changed from this fixed position only by applying a rotary force to the bolt to compensate for tare. A nut is disposed on the shank of the bolt externally of the housing. A ring is disposed on the shank of the bolt between the head of the bolt and the nut. The housing is rotatable relative to the ring to dispose the scale in front of the viewer without affecting the longitudinal disposition of the shank of the bolt in the housing.

8 Claims, 1 Drawing Sheet

U.S. Patent  Oct. 23, 1990  4,964,479

WEIGHT SCALE COMPENSATING FOR TARE

This invention relates to a scale for weighing an object. More particularly, the invention relates to a scale which is constructed to provide a simple and easy compensation for tare. The invention also relates to a scale which can be rotated to dispose the scale indications in proper view without affecting the compensation for tare.

One type of scale for weighing an article generally includes a long and narrow hollow housing with a longitudinal opening and progressive indications at progressive positions along the opening. A helical spring is disposed longitudinally within the housing and is adapted to become constrained in accordance with the weight of the article when the article is coupled to the spring. A flag is disposed at the position of the opening in the housing and is movable longitudinally in accordance with the constraint of the spring to identify, by its contiguous disposition to the scale indications, the weight of the article.

In order to couple the weight to the spring, a rod is generally coupled to the spring and is extended longitudinally through one end of the housing to receive a coupling member for holding the article. Different coupling members may be attached to the rod at different times depending upon the type of article to be weighed. Each of these coupling members may have a different weight. An adjustment should accordingly be made to compensate for the tare resulting from the weight of each coupling member.

The problem of compensating for tare has existed for a long time. A considerable effort has been made, and significant amounts of money have been expended, to overcome this problem. Although solutions have been provided, they are not simple or reliable. Furthermore, a problem has persisted of adjusting the rotary disposition of the housing to make the scale indications visible without affecting the compensation for tare.

This invention provides a scale which overcomes the disadvantages discussed above. The scale of this invention includes features which provide for a simple and reliable adjustment for tare. The scale of this invention also provides for a rotary adjustment of the housing to dispose the flag and the scale indications in front of the viewer without affecting the compensation for tare.

In one embodiment of the invention, a hollow housing with openings at opposite ends has progressive indications of weight at progressive positions along an opening in the housing. A threaded shank of a bolt extends longitudinally into the housing through the opening at the first end. A spring disposed in the housing is attached at one end to the shank of the bolt and at the other end to a rod which extends through the second end of the housing. A coupling member is adapted to be attached to the rod to hold an article to be weighed.

A retaining nut is disposed within the housing at the first longitudinal end of the housing to receive the shank of the bolt. A packing member retained by the nut is partially tapped to receive the bolt shank. By only partially tapping the packing member, the bolt is retained in fixed position relative to the nut. The bolt is changed from this fixed position only by applying a rotary force to the bolt to compensate for tare.

A nut is disposed on the shank of the bolt externally of the housing. A ring is disposed on the shank of the bolt between the head of the bolt and the nut. The housing is rotatable relative to the ring to dispose the scale in front of a viewer without affecting the longitudinal disposition of the shank of the bolt in the housing.

Figure 2:
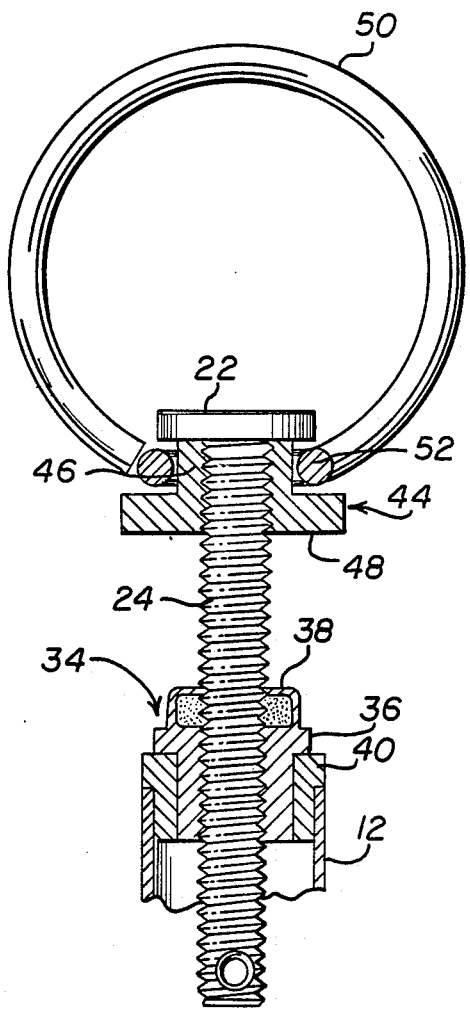
Figure 3:
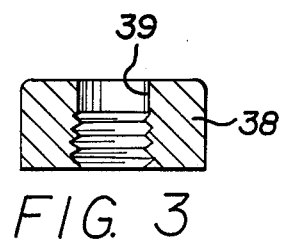

In the drawings:

FIG. 1 is an elevational view, partially in section and with some members partially broken away, of a scale constituting one embodiment of the invention;

FIG. 2 is an enlarged fragmentary elevational view, similar to that shown in FIG. 1, of a portion of the scale shown in FIG. 1; and FIG. 3 is an enlarged elevational view of one of the members shown in FIGS. 1 and 2. In one embodiment of the invention, a scale generally indicated at 10 is provided. The scale 10 includes a hollow housing 12, preferably cylindrical, which is preferably provided with a relatively long axial length and a relatively small diameter. An opening 14 extends longitudinally along a substantial portion of the axial length of the housing 12. Scale indications 16 representing weight are provided on the housing in the longitudinal direction, preferably at positions adjacent the opening 14 in the housing. The housing 12 is open at its opposite longitudinal ends.

A bolt generally indicated at 20 has a head 22 and a shank 24, preferably threaded. The shank 24 extends into the housing 12 through the opening at the upper longitudinal end of the housing. A spring 26, preferably helical, is attached at one end to the shank 24 of the bolt 20 at the bottom end of the bolt and is extended downwardly in the housing. A rod 28 is disposed within the housing 12 and is attached to the other end of the spring 26. A flag 32 is disposed on the rod 28 at a position visible through the opening 14 in the housing 12 to indicate the reading on the scale 16. A coupling member 30 is adapted to be attached to the rod 28 and to hold an article to be weighed. Although the coupling member 30 is shown as a hook, it will be appreciated that it may be in any form.

A retaining assembly generally indicated at 34 is disposed partially in the housing 12 and partially externally to the housing and is adapted to prevent any inadvertent rotation of the bolt 20. The retaining assembly 34 may include a retaining nut 36 constructed in a conventional manner. The retaining nut 36 is internally threaded to be variably disposed on the shank 24 of the bolt 20. A packing member 38 having a conventional construction is disposed on the retaining nut 36 externally of the housing 12. The packing member 38 is only partially tapped so as to retain the retaining nut 36 in substantially fixed relationship to the housing 12. This is indicated at 39 in FIG. 3. A sleeve 40 is disposed between the retaining nut 36 and the housing.

A nut generally indicated at 44 is variably disposed on the shank 24 of the lock bolt 20. The nut 44 is provided with a shank 46 and a head 48 and is disposed with the head of the nut displaced from the head of the bolt 20. A ring 50 is retained on the shank 24 of the bolt 20 between the head of the bolt 20 and the head of the nut 44. The ring 50 is provided with a coiled portion 52 which is wrapped around the shank of the bolt 20 in rotatable relationship to the shank.

When the tare of the scale 10 is varied by disposing the coupling member 30 on the rod 28, the bolt 20 can be adjusted relative to the retaining nut assembly 24 to compensate for the tare. The compensation of the tare is accomplished when the flag 32 is adjacent the zero (0) reading on the scale 16. When the nut has been adjusted to compensate for the tare, it is retained in position because the packing member 38 is not completely tapped. The bolt 20 is then retained in position by the lock-nut assembly 34 against any inadvertent turning of the bolt 20. In this way, the compensation of the tare is maintained at this adjusted value until a different coupling member 30 is disposed on the rod 28.

As will be appreciated, it is desirable to have the opening 14 in the housing 12 and the scale indications 16 face forwardly to facilitate the ease of reading the position of the flag 32 on the rod 28. However, it may sometimes happen that the housing 12 is rotated to a position where the viewing of the position of the flag 32 relative to the scale indications 16 is impeded. When this occurs, the housing 12 may be rotated relative to the ring 50 without affecting the position of the bolt 20 in the housing. This results from the disposition of the coiled portion 52 of the ring 50 on the shank 24 of the bolt 20 between the head of the bolt 20 and the head of the nut 44 such that the bolt 20 is rotatable relative to the ring 50.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for weighing an article,
    a hollow housing having a longitudinally extending opening and having indications of weight at progressive positions in the longitudinal direction,
    a bolt having a head disposed externally of the housing and having a threaded shank extending longitudinally into the housing,
    a spring attached at one end to the shank of the bolt and having properties of being coupled to the article at the other end to become constrained in accordance with the weight of the article,
    a retaining nut disposed in the housing and having a threaded aperture to receive the shank of the bolt and to provide for an adjustment in the positioning of the bolt to compensate for tare, and
    packing means disposed in co-operative relationship with the retaining nut for receiving the bolt to retain the bolt in fixed positioning after the adjustment of the bolt to compensate for tare, the packing means including a packing member only partially tapped to provide for an increase in the force required to adjust the position of the bolt relative to the locking nut.

2. In a combination as set forth in claim 1,
    a nut normally disposed on the shank of the bolt in tight relationship with the head of the bolt and adjustable relative to the head of the bolt, and
    a ring disposed on the nut between the head of the bolt and the nut in rotary disposition relative to the bolt and the nut to provide for an adjustable positioning of the housing to dispose the scale on the housing in view without affecting the longitudinal position of the bolt in the housing.

3. In a combination as set forth in claim 2,
    a rod coupled to the end of the spring opposite the bolt and extending through the housing at the opposite longitudinal end of the housing from the head of the bolt to receive the article to be weighed.

4. In combination for weighing an article,
    a hollow housing open at opposite longitudinal ends and having a longitudinally extending opening,
    a bolt having a shank extending through a first longitudinal end of the housing and having a head disposed externally of the housing at the first end of the housing,
    first means disposed on the bolt for cooperating with the bolt to provide for an adjustment of the positioning of the bolt in the housing to compensate for tare,
    second means disposed on the bolt within the housing in co-operative relationship with the first means for maintaining the bolt in a fixed relationship with the housing after the adjustment of the bolt to compensate for tare, and
    means including a spring operably coupled to the shank of the bolt for receiving the article at a position external to the housing at the second end of the housing for indicating the weight of the article,
    the shank being externally threaded, and
    the first means including a retaining nut internally threaded on the shank of the bolt to provide for a rotary adjustment in the disposition of the bolt in the housing to compensate for tare, and
    the second means including a packing member only partially tapped to retain the bolt in fixed position after the positioning of the bolt has been adjusted to compensate for tare.

5. In a combination as set forth in claim 4,
    a nut disposed on the bolt externally of the housing, and
    a ring retained between the externally disposed nut and the head of the bolt to provide for a rotary adjustment in the position of the housing without affecting the compensation for tare.

6. In combination for weighing an article,
    a hollow housing having a body and having a longitudinally extending opening and having openings at the opposite longitudinal ends of the body,
    a bolt having a head external to the housing at the first longitudinal end of the housing and having a shank extending through the first longitudinal end of the housing,
    first means disposed within the housing at the first longitudinal end of the housing for maintaining the bolt in fixed position relative to the housing,
    second means extending from the bolt through the second longitudinal end of the housing for receiving the article and having properties of being extended relative to the opening in the housing by the weight of the article to provide an indication of the weight of the article, and
    third means disposed on the bolt in cooperative relationship with the shank of the bolt and the first means for providing for an adjustment in the longitudinal positioning of the bolt in the housing to compensate for tare,
    a nut disposed on the shank of the bolt externally of the housing, and
    means disposed on the bolt between the head of the bolt and the externally disposed nut for providing for adjustments in the rotary disposition of the housing to dispose the opening in the housing in a forward position,
    the first means including a packing member only partially tapped to receive the shank of the bolt.

7. In combination for weighing an article, a hollow housing having a longitudinally extending opening and having indications of progressive weights at progressive positions along the opening, the housing being open at the longitudinally opposite ends of the housing, a bolt having a head and a shank, the shank extending through the first open end of the housing, spring means supported by the bolt at the end of the shank within the housing and extending from the housing at the second open end of the housing for receiving the article to become constrained in accordance with the weight of the article, first means disposed on the shank of the bolt within the housing for maintaining the bolt in fixed position rotationally relative to the housing to prevent any inadvertent adjustment in the positioning of the bolt relative to the housing, second means disposed on the shank of the bolt in cooperative relationship with the shank of the bolt to provide for an adjustment of the shank longitudinally in the housing to provide a compensation for tare, the first means disposed on the shank of the bolt including a packing member only partially tapped.

8. In a combination as set forth in claim 7, the first means disposed on the shank of the bolt including the packing member only partially tapped, the second means including a retaining nut, a nut disposed on the shank of the bolt externally of the housing, and a ring disposed on the shank of the bolt between the head of the bolt and the externally disposed nut for providing for a rotation of the housing without affecting the compensation for tare.

* * * * *